United States Patent
Mischook et al.

(10) Patent No.: US 10,270,835 B2
(45) Date of Patent: Apr. 23, 2019

(54) DETERMINATION OF INFORMATION RELATING TO MESSAGES

(71) Applicant: Openwave Mobility, Inc., Redwood City, CA (US)

(72) Inventors: Richard Mischook, Dungannon (GB); Paul Marquess, Belfast (GB)

(73) Assignee: Openwave Mobility, Inc., Redwood City, CA (US)

( * ) Notice: Subject to any disclaimer, the term of this patent is extended or adjusted under 35 U.S.C. 154(b) by 16 days.

(21) Appl. No.: 14/067,741

(22) Filed: Oct. 30, 2013

(65) Prior Publication Data

US 2014/0122647 A1    May 1, 2014

(30) Foreign Application Priority Data

Oct. 30, 2012    (GB) .................................. 1219523.6

(51) Int. Cl.
*H04L 12/24* (2006.01)
*H04L 29/08* (2006.01)
*H04L 29/06* (2006.01)

(52) U.S. Cl.
CPC .............. *H04L 67/02* (2013.01); *H04L 67/28* (2013.01); *H04L 67/2804* (2013.01); *H04L 67/2819* (2013.01); *H04L 69/22* (2013.01)

(58) Field of Classification Search
CPC ..................................................... H04L 29/08
USPC ................................................. 709/217, 203
See application file for complete search history.

(56) References Cited

U.S. PATENT DOCUMENTS

| | | | | |
|---|---|---|---|---|
| 6,948,186 B1 * | 9/2005 | Brosey | ............ | H04N 21/23608 375/E7.022 |
| 7,505,464 B2 * | 3/2009 | Okmianski | ....... | H04L 29/12103 370/392 |
| 7,940,757 B2 * | 5/2011 | Sherman et al. | ............. | 370/389 |
| 8,239,457 B1 * | 8/2012 | Laumen | ................ | H04L 51/066 709/206 |
| 2003/0110234 A1 * | 6/2003 | Egli | ....................... | G06T 3/4092 709/217 |
| 2005/0149823 A1 * | 7/2005 | Lee | ..................... | H03M 13/096 714/758 |
| 2005/0220095 A1 * | 10/2005 | Narayanan | ............ | H04L 63/126 370/389 |
| 2006/0036747 A1 * | 2/2006 | Galvin, Jr. | .............. | H04L 67/14 709/228 |

(Continued)

FOREIGN PATENT DOCUMENTS

EP       1990977 B1    10/2012
WO    2002010929 A1    2/2002

*Primary Examiner* — Ario Etienne
*Assistant Examiner* — Elizabeth Kassa
(74) *Attorney, Agent, or Firm* — EIP US LLP

(57) ABSTRACT

Methods, apparatus and computer programs are provided for determining header data for and based on a plurality of messages. Each message comprises header data having a plurality of fields each of which has a value. A first message is received and data indicative of at least some of the header data of the first message is stored. A second message is received and a value for at least one given field associated with header data for the second message is determined based at least on the stored data and the header data of the second message. The determined value is other than a value of the given field of the second message.

15 Claims, 5 Drawing Sheets

(56) References Cited

U.S. PATENT DOCUMENTS

| | | | |
|---|---|---|---|
| 2006/0168250 A1* | 7/2006 | Feng | H04L 67/22 709/228 |
| 2006/0168334 A1* | 7/2006 | Potti | H04L 67/1008 709/239 |
| 2007/0058633 A1* | 3/2007 | Chen | H04L 69/22 370/392 |
| 2008/0270542 A1* | 10/2008 | Tu | H04L 65/105 709/206 |
| 2009/0106349 A1* | 4/2009 | Harris | 709/203 |
| 2010/0096344 A1 | 4/2010 | Vanderhoek et al. | |
| 2010/0175122 A1* | 7/2010 | Ballard | 726/12 |
| 2011/0153612 A1* | 6/2011 | Paul | G06F 17/30905 707/740 |
| 2011/0200045 A1* | 8/2011 | Baehre | H04L 12/4633 370/392 |
| 2012/0096344 A1* | 4/2012 | Ho et al. | 715/249 |
| 2012/0254402 A1* | 10/2012 | Panidepu | G06F 17/30905 709/224 |
| 2012/0297308 A1* | 11/2012 | Anikul | G06Q 30/02 715/738 |
| 2013/0138750 A1* | 5/2013 | Blaschke | H04L 12/40032 709/206 |
| 2013/0226692 A1* | 8/2013 | Kouladjie | G06Q 30/02 705/14.45 |
| 2013/0332518 A1* | 12/2013 | Chor | H04L 67/42 709/203 |

* cited by examiner

DETERMINATION OF INFORMATION RELATING TO MESSAGES

CROSS-REFERENCE TO RELATED APPLICATIONS

This application claims priority under 35 U.S.C. § 119 to UK Patent Application No. GB 1219523.6, filed on Oct. 30, 2012, the content of which is hereby incorporated herein by reference in its entirety.

BACKGROUND OF THE INVENTION

Field of the Invention

The present disclosure relates to systems and methods for determining header data relating to a message; and in particular to determining header data which is other than that provided in a message.

Description of the Related Technology

Messages, such as HTTP requests and other similar network messages contain header data which identifies, amongst other things, the type of application sending the message, and the format for any desired response. For example, the "user-agent" header field in a HTTP request identifies the type of browser (i.e. application) which sent the HTTP request.

In some cases some fields within the header data are omitted or contain erroneous or ambiguous data. For instance, a browsing application (e.g. Safari or Chrome) may be available in different versions, one for a desktop computer and another for mobile telephone, but may fail to specify which version is sending the message. A further example, often described as spoofing, is where the user-agent header field identifies an application other than the one sending the message. This may be done to achieve a certain effect, such as enabling a browser on a mobile device such as a smart phone to retrieve a webpage formatted for a desktop browser, and vice versa.

Incorrect, incomplete or omitted header data, whether done deliberately or not, can cause problems. Therefore, it is desirable to be able to have a method of determining header data for a message.

SUMMARY

In accordance with at least one embodiment, methods, devices, systems and software are provided for supporting or implementing functionality to determine header data for a message.

This is achieved by a combination of features recited in each independent claim. Accordingly, dependent claims prescribe further detailed implementations of various embodiments.

According to an exemplary embodiment, there is provided a method of determining header data for and based on a plurality of messages, each message comprising header data, the header data comprising a plurality of fields each having a value, the method comprising: receiving a first said message; storing data indicative of at least some of the header data of the first message; receiving a second said message; and determining a value for at least one given field associated with header data for the second message, based at least on the stored data and the header data of the second message, wherein the determined value is other than a value of the given field of the second message.

Messages, such as HTTP request, contain header data. This header data may contain a plurality of fields, each having a value, i.e. a name-value pair. It will be apparent that value here is given its traditional meaning in the field of messaging and is therefore not limited to a numeric value. The fields of the header data may, for example, identify the type of agent making the request, the capabilities of the agent and the nature of acceptable responses (i.e. compressed, not compressed). In some cases, some fields of header data are not provided or are incorrectly provided (i.e. the value is incorrect). Incorrect provision of the header field "user agent" in particular can be done deliberately, a process known as spoofing.

For a given request, it is typically not possible to accurately determine omitted, incomplete or incorrect header data from an inspection of the message itself. However, the inventors have identified that it is possible to determine omitted or incorrectly provided header data using data from a plurality of messages. Therefore, by storing information relating to a first message, it is possible to determine header data for a second message from the second message itself and from the stored data. Therefore, embodiments are able to more accurately determine header data values which have been omitted or incorrectly/incompletely provided. It will be apparent that when a value in the header data is incorrectly or incompletely (i.e. ambiguously) provided, the determined header data will contain a value which is other than, i.e. different to, the received value. It will be understood that where a field is omitted in a message, this is the equivalent of providing a null value for that field, and therefore the determined value will again be other than the provided value.

The messages may comprise requests for webpage data to be processed by a browser. The header data may comprise a source address, and the method may comprise selecting stored data associated with the source address of the second message.

The messages may each comprise a source address, such as an IP address of the agent sending the messages. Different messages may be received from different source addresses. Therefore to ensure that the appropriate information is selected to be used in the determining of a value for the second message, the step of selecting stored data associated with the source address of the second message may be included.

The determined value may be indicative of an identity of an agent sending the second message; and the method may comprise using the determined identity to retrieve property data associated with the agent.

Some information is not available in the header data of messages, irrespective of whether it is omitted or not. This information may include properties of the agent sending the message, such as screen size, processing capabilities or the type of device (i.e. make and model). In embodiments, by determining the identity of the agent sending the message, it is possible to determine these other properties by looking up information in a memory. The property information may be stored in, for example, a database. Here the type of agent may refer to a type of device, a type of application running on a device, or a combination of the two.

The messages may originate from a plurality of different applications running on a device, and the first message may originate from a first of the applications and the second message may originate from a second of the applications.

Any given device, such as a computer, tablet or smartphone may run many different applications, each sending messages. Some of the messages, originating from a first application, may contain correct header data, while other messages, from a second application, may omit, or contain incorrect, header data. By using stored data relating to a first message from a first application, it is possible to more accurately determine header data for a second message from a second application. For example, the stored data relating to a message from the first application may be used to identify the type of device and/or an operating system running on the device. From this information about the second application can be inferred, and thus corrected header data for the second message determined.

The header data may comprise one or more of: one or more user-agent fields; one or more fields identifying a device from which the messages are sent; one or more fields identifying an IP address of a device from which the messages are sent; one or more fields identifying requested data; one or more fields identifying an acceptable format of the requested data; one or more fields identifying a protocol; one or more fields identifying an application sending the message; one or more fields identifying the capabilities of an application sending the message; and one or more fields identifying a resolution of a screen on which the requested data will be displayed.

The method may comprise: receiving a plurality of first said messages; and storing data indicative of at least some of the header data of the plurality of first messages.

In some embodiments the header data for the second message may be determined based on stored header data relating to a plurality of first messages. This means that there is more data available for the determination of the second message header data, and therefore the accuracy, or confidence in any determination can be increased. In these embodiments, some of the first messages may be received from a first application and some may be received from a second application. The second message may be received from either of the first or second application.

The messages may be intercepted by a network node and forwarded to a server based on a destination address specified in said header data.

While some embodiments may be provided in an end point server, that is a server which responds to the messages, in alternative embodiments the messages may be intercepted by a network node and forwarded to a server. This has the advantage that header data from messages to different servers may be used to determine the header data for the second message, and therefore there is more information for use in this determination.

The method may further comprise: receiving at least one third message, the at least one third message being a response to one or both of the first and second messages and comprising header data; storing data indicative of at least some of the header data of the at least one third message; and determining header data for the second message based additionally on the stored information associated with the at least one third message.

In some embodiments, responses to the messages may also be used to determine header data. For example, if an accepted format header field is omitted, then the format of the third message may be used to determine a value for this omitted data. Alternatively, the third message may contain header data which contradicts the second message header data. This may occur if the application sending the message and the software sending the response are provided by the same group or company, and as such have been written to be compatible, despite the incorrect header data being provided in the second message. In such cases, the header data of the third message may be used to infer the correct header data for the second message.

The third message may be a response to a first message, in particular where the header data of the first and the second message are similar. The third message may alternatively, or additionally, be a response to the second message.

The header data of the third message may comprise a plurality of fields, the fields comprising one or more of: a field identifying a type of data contained in the response; a field identifying a format of data contained in the response; a field identifying a protocol used for data contained in the response; a field identifying a size of the response.

The method may further comprise: modifying header data for the second message based on the determined header data; and forwarding the modified second message to the remote server.

In some embodiments, the determined header data may be used to modify a second message before it is sent to a remote server. This may be done to ensure that the server provides an appropriate response to the message. For example, header data specifying acceptable formats for a response may be added to the second message, or the appropriate field may be overwritten.

The method may further comprise: receiving a third message, the third message being a response to the second messages and comprising header data; modifying header data for the third message based at least on the stored data.

In some embodiments, the determined header data may be used to modify a second message before it is sent to a remote server. This may be done to ensure that the server provides an appropriate response to the message. For example, header data specifying acceptable formats for a response may be added to the second message, or the appropriate field may be overwritten.

The first message may originate from a first device, and the second message may originate from a second device other than the first device, the second device being communicatively coupled to the first device such that the second message is transmitted via the first device, the method may comprise identifying, from the determined header data, that the second message originates from a device other than the first device.

In some embodiments, a second device may send messages through a first device. One example of this is known as tethering, where a computer uses a mobile phone as a modem, and sends messages through the mobile telephone. In such situations, the mobile phone may itself send the first message, and the computer may send the second message via the mobile phone. The computer messages may identify the computer as a mobile phone to avoid detection. Therefore, in these embodiments, the determined header data may be used to correctly identify the originator of the message as a computer, i.e. a device other than the first device.

The method may comprise sending data in response to the second message, at least a part of the sent data being adapted based on the determined header data.

In some embodiments, the determined data may be used to adapt data being sent to the device. For example, correctly determining a value for a user agent field may be used to send data compatible with that user agent.

At least one of the messages may be received from an application, and the method may comprise: sending a response to said at least one message, the response including scripting instructions, which are configured, when executed within the application, to: identify at least one property of the application; and cause the application to send information indicative of the at least one property; and the method may comprise: receiving the information indicative of the at least one property; and using the at least one property whereby to determining header data for the second message.

In some embodiments, scripting instructions may be included into a response. These scripting instructions may then be executed within the application sending the messages and may identify properties of the application from within. These properties may then be used in the determination of the header data. For example, when the application is a browser, the scripting instructions may include JavaScript which may in turn make a call to the JavaScript API within the browser. This call to the API may identify information which the browser is omitting from, or incorrectly specifying in, the messages According to a further exemplary embodiment, there is provided an apparatus for determining header data for and based on a plurality of messages, each message comprising header data, the header data comprising a plurality of fields each having a value, the apparatus comprising a processing system configured to: receive a first said message; store data indicative of at least some of the header data of the first message; receive a second said message; and determine a value for at least one given field associated with header data for the second message, based at least on the stored data and the header data of the second message, wherein the determined value is other than a value of the given field of the second message.

According to another exemplary embodiment, there is provided a computer program product comprising a non-transitory computer-readable storage medium having computer readable instructions stored thereon, the computer readable instructions being executable by a computerized device to cause the computerized device to perform a method of determining header data for and based on a plurality of messages, each message comprising header data, the header data comprising a plurality of fields each having a value, the method comprising: receiving a first said message; storing data indicative of at least some of the header data of the first message; receiving a second said message; and determining a value for at least one given field associated with header data for the second message, based at least on the stored data and the header data of the second message, wherein the determined value is other than a value of the given field of the second message.

Further features and advantages will become apparent from the following description of preferred embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which.

Several parts and components of the embodiments appear in more than one Figure; for the sake of clarity the same reference numeral will be used to refer to the same part and component in all of the Figures.

DETAILED DESCRIPTION OF CERTAIN INVENTIVE EMBODIMENTS

Figure 1:
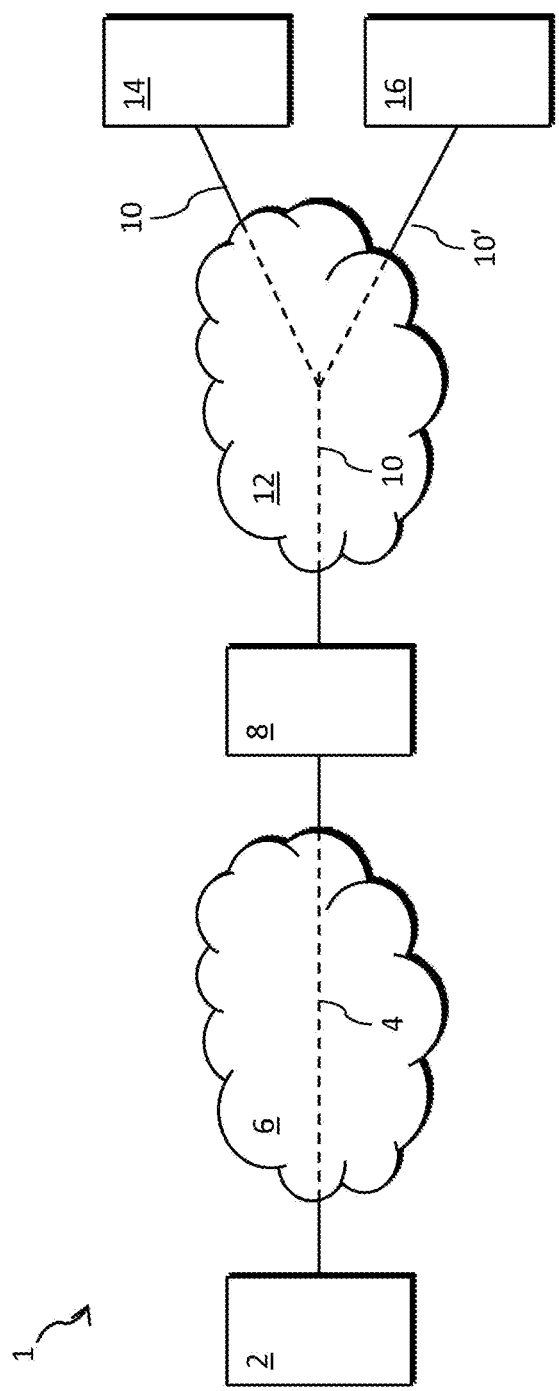
FIG. 1 shows a schematic diagram of communications system.

A communications system in which embodiments may be practiced is shown in FIG. 1. The system 1 contains a communications device 2, which has a connection 4 via a network 6 to a network node 8. The network node 8 in turn has connections 10 and 10' via network 12 to remote servers 14 and 16 respectively.

In a typical scenario the communications device 2 may be user equipment such as a computer, tablet, internet capable mobile telephone (i.e. smartphone) or the like. The network 6 may be an access network for the internet for example a 3G or LTE mobile network, or a PTSN or Cable network connecting the device 2 to an internet service provider (ISP). The connection 4 may have both wired and wireless elements, including 3G/LTE as mentioned and/or 802.11 (WiFi).

In this embodiment, the network node 8 is arranged so as to be able to intercept messages sent from the device 2 to the servers 14 and 16. To enable this, the network node 8 may be provided as a part of an access network, i.e. as part of network 6. As such, the network node 8 may be provided within or alongside an internet gateway element.

Network 12 may represent a wide area network, such as the internet, through which messages may be sent to the servers 14 and 16. The servers in turn are capable of receiving messages from devices such as the device 2, and sending responses. In particular embodiments, the servers are webpage servers, and are arranged to send webpage data to the device 2 in response to a webpage request such as an HTTP request.

Figure 3:
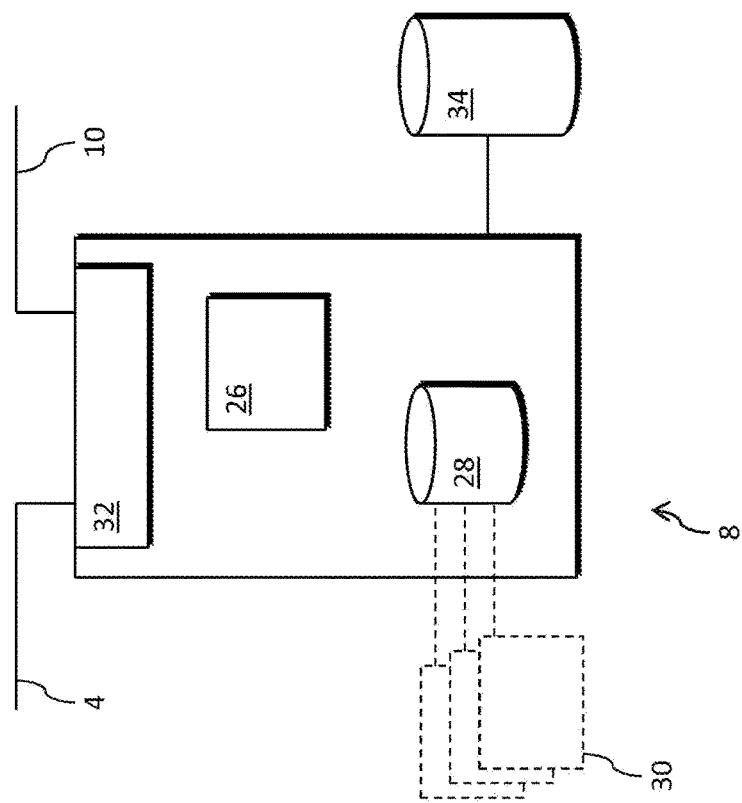
FIG. 3 shows a schematic diagram of the network node shown in FIG. 1.
Figure 2:
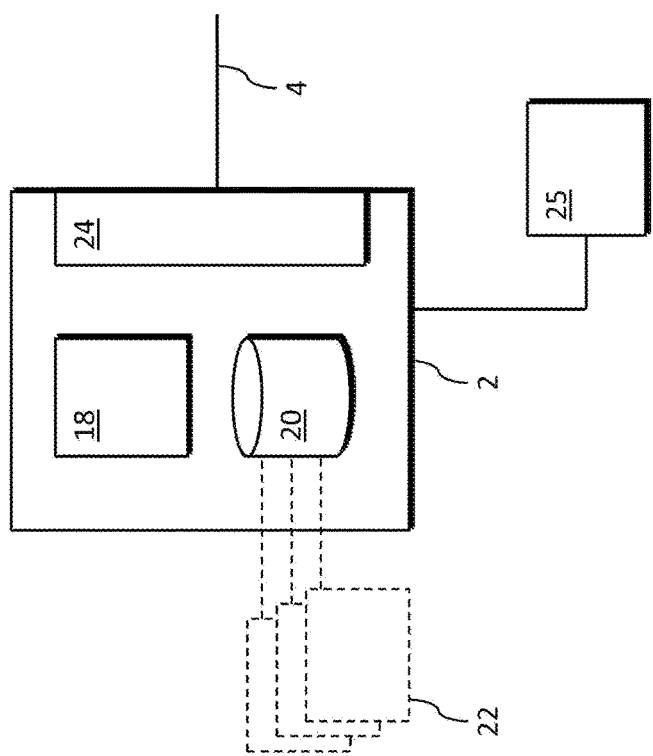
FIG. 2 shows a schematic diagram of the communications device shown in FIG. 1.

FIGS. 2 and 3 show more detail of the components of the device 2 and network node 8 respectively.

In FIG. 2, the device 2 is provided with a processing system 18 and a memory 20. An interface 24 connects the device to the connection 4 described above. The processing system 18 may contain a CPU, cache memory, bus and the like as are known in the art. The memory 20 may be volatile or non-volatile, such as a hard drive, flash memory, RAM or similar. The interface 24 may operate according to a number of known standards, and may be configured appropriately. For example the interface 24 may be a cellular, i.e. 3G or LTE standard wireless interface, a 802.11 (WiFi) interface, Ethernet, or any other suitable type. Although not shown, the device 2 may also comprise, or be connected to, any number of human interface elements, such as display and audio systems, as well as user input devices such as a touchscreen, buttons, keyboard, microphone and the like.

The memory 20 stores applications 22 containing computer instructions which may be executed by the processing system 18 as is known in the art. In accordance with the computer instructions of the applications 22, the processing system 18 sends messages via the interface 24 to the servers 14 and 16. Equally the processing system 18 may receive messages via the interface 24, and process the data contained within. The memory 20 may store a plurality of applications, each able to cause messages to be sent and received via the interface 24.

As an example, one of the applications may be a web browser application. The web browser application causes the processing system 18 to display a web browser user interface to a user. Using the user interface the user may browse to or otherwise select a desired website. The processing system 18 may then cause the interface 24 to send an HTTP request message to the server hosting the desired website. The subsequent HTTP response may be received by the interface 24 and interpreted by the processing system 18 under control of the browser application 22 to display the requested webpage on a screen of the device 2. This process may be repeated with, for example, the user clicking a link, and the processing system 18 requesting a further webpage from the server.

Other applications may also cause the device 2 to send and receive messages. For example an email program may send IMAP, POP or SMTP messages. A data presenting 'app' or 'widget', such as a train times app, may send, for example a SOAP request to a server and receive an XML response. Each of the messages sent under the control of an application will be sent via the interface 24 to a server, and will be intercepted by the network node 8.

In addition to the applications stored in the memory 20, the processing system 18 may receive, via the interface 24, messages containing further computer instructions, which may in turn be executed by the processing system 18. The further computer instructions may be applications in themselves, or scripting instructions which may be executed within an application stored in the memory 20. For example, where an application is a browser, the scripting instructions may be JavaScript instructions, which are executable within the API of the browser application. At least some of the received data may be stored in the memory 20, for example, to enable applications to be downloaded for later execution. The received instructions or applications may themselves cause the device 2 to send and receive messages.

The device 2 may optionally be connected to a further device 25. In this situation the further device 25 may comprise its own processing system and memory storing applications. The applications on the further device 25 may be executed to cause the further device 25 to send messages via the device 2 to the servers 14 and 16. For example, in a process known as tethering, a computer—device 25—may connect to the internet via a mobile telephone—device 2.

FIG. 3 shows network node 8. The network node comprises a processing system 26 and a memory 28. The memory contains computer readable instructions which are executed by the processing system 26, as will be described in more detail later. The network node 8 further comprises an interface 32, which connects the network node 8 to connection 4—to the device—and connection 10—to the servers 14 and 16.

The network node 8 may further be connected to a store 34, such as a database. This store may be configured to store data received in messages sent between the device 2 and servers 14 and 16, as will be described in more detail below.

It will be appreciated that in the description below, where the device 2, or network node 8 is described performing certain steps, that it is the respective processing systems 18 and 26 of these elements which are performing the steps under the control of computer instructions which may have been retrieved from the memories 20 and 28. Equally, where an application is described as sending or receiving a message, this indicates that the relevant processing system has sent or received a message while executing that given application.

A detailed description of the messaging flows according to embodiments will be provided later. Nevertheless, in general, the device 2 sends messages to the servers 14 and 16. Each of the messages will have originated from a given application; that is the message will have been generated by the processing system while executing the instructions within the application. The given application may be one of the applications 22 stored in the memory 20 and executed by the processing system 18 of the device 2, or may be an application executed on the further device 25.

The sent messages are routed to the desired server 14 or 16, via the network node 8. As noted above, the network node 8 may intercept, and then forward, the messages on to the appropriate server. The network node 8, or specifically the processing system 26 of the network node 8, may process and/or store data contained within the intercepted message, as will be described in more detail below.

The servers 14 and 16 may themselves send further messages to be routed to the device 2, via the network node 8. These further messages may be responses to the messages received from the device 2. The network node 8 may therefore also intercept and store/process any messages from the servers before forwarding the responses on to the device 2.

The messages contain header data and a payload. This header data comprises a plurality of fields, each associated with a value (which is given the customary meaning in the art—that is the value may be a text string, array etc. and is not limited to a numeric value). Some fields, where the field is optional, may be accompanied by a name to provide a name-value pair. Other fields may simply be identifiable by a position in the header data.

It will be appreciated that, in accordance with known techniques, a given message may contain header data existing on different communication layers. For example HTML data sent via HTTP over an IP network will contain HTML header data, HTTP header data, and IP header data. As such, it will be appreciated that header data as described herein may encompass header data existing on any given communication layer.

By way of example, the header data may contain at least one of the following fields:

- One or more fields identifying a source address—the address, or other unique identifier of the device sending the message; this may be, for example, an IP address.
- One or more fields identifying a destination address—the address, or other unique identifier of the server to which the message is addressed; this may be, for example, an IP address.
- One or more user-agent fields—that is a field which identifies the agent sending the message. The user-agent field may identify a type of an application running on the device 2
- One or more fields identifying a type of the device 2—for example, the field may identify that the device is a mobile telephone, tablet, or computer. This field may directly, or indirectly, also identify the capabilities of the device.
- One or more fields identifying a port or other similar identifier—as described above, multiple applications may each send messages from the device to the servers, to enable any response messages to be correctly routed once received by the device, the messages may contain port identifiers, where each port has a one-to-one association with an application within the device.
- One or more fields identifying requested data—in some embodiments the message may form a request for data, such as an HTTP request, therefore one or more fields may identify what data is required from the server identified by the destination address. These one or more fields may include all or part of a uniform resource location (URL). Alternatively or additionally, these one or more fields may identify data to be used by the server to generate a response, i.e. the fields for a HTTP POST request or a SOAP request. In some embodiments, a single field may be provided identifying both the destination address (i.e. the server) and the requested data.

One or more fields identifying an acceptable format of the requested data—such fields may, for example, specify that compressed data can be accepted, or that HTML, XML or other markup standards may be used.

One or more fields identifying a protocol—typically the message will identify the protocol being used, and may identify a desired protocol for any response, if different from the request.

One or more fields identifying the capabilities and/or properties of an application sending the message—in such a field the application may specify, for example, that it cannot operate with frames, despite a format field (described above) specifying that HTML is acceptable.

One or more fields containing HTML header data—that is data contained within the <HEAD> element of a HTML page.

One or more fields containing Javascript attributes or functions—these attributes may also not be universal and therefore specific to certain applications on certain devices.

One or more fields identifying support for certain CSS selectors or capabilities.

One or more fields identifying a resolution of a screen on which the requested data will be displayed.

One or more fields identifying a expiry time for the data—for example, a time to live (TTL) field in an IP packet identifies how long the packet should be kept alive for.

One or more fields identifying data to be sent to the server—in some situations the device may upload data to the server, these fields may identify a type or intended recipient for the uploaded data.

One or more fields identifying a size of the message—i.e. the size of the payload.

Prior to a description of messaging flows according to particular embodiments, and to put these embodiments into context, two use scenarios of the communications system described above in FIGS. 1 to 3 will be provided. It will be appreciated that the aspects of the use scenarios described here are optional, and are not essential to the later described embodiments.

In a first use scenario, the device 2 executes two applications, one of which is a web browser, such as Internet Explorer, Chrome, Firefox, Opera or Safari, the other of which is a gaming application.

In accordance with methods known in the art, the web browser application sends HTTP request messages to a webpage server which will be taken to be server 14. Server 14, in response, sends webpage data to the device 2, which is received and displayed by the browser. This enables a user to browse the web in the conventional manner.

The gaming application by contrast does not offer the facility for browsing the web, and instead is concentrated on providing a game to a user. However, the gaming application is arranged to display advertisements to a user in a portion of the screen of the device 2. These advertisements are requested by the application from an advertisement server, which may be server 16. In this example, the advertisements are requested, and provided, as webpage data. In other words, the gaming application, to display an advertisement, displays a specific webpage to the user. The webpage is requested by the application, and displayed in a limited manner, i.e. in such a way that a user cannot browse the web, but only view the advertisement.

Therefore, as will be apparent, both applications send messages, which are requests for webpage data, to the servers 14 and 16, and receive response messages from the servers 14 and 16 which contain the requested webpage data. As mentioned above, both the request messages and the response messages are intercepted by the network node 8, and forwarded by the network node 8 to the intended recipient.

In this use scenario, in addition to the functionality for determining header data which will be described below, the network node 8 is configured to modify the webpage data sent from the servers 14 and 16 to the device 2. This modifying of the webpage data may be done to include an alert or a toolbar, which may be presented as a banner across the top of bottom of the requested webpage when it is displayed on the device 2.

Such an alert or toolbar may be desired when the webpage data is being sent to the browser application. However, the alert or toolbar will not be desired when the webpage data comprises the advertisement, which is to be viewed in the limited environment of the gaming application. As will be appreciated, an added toolbar or alert may obstruct the advertisement, and at worst, may cause the gaming application to error or crash due to the unexpected data.

With reference to the description of the header data above, the messages sent by both applications may contain an indication of a user-agent. In an ideal scenario, the browser will give a value for the user-agent field which identifies it as a browser, and the gaming application will give a value for the user-agent field differentiating it from the browser, and ideally identifying it as a gaming application or similar. Therefore, by looking at the user-agent header data, the network node 8 will be able to differentiate messages sent by the browser from messages sent by the gaming application.

However, this is often not the case, and the gaming application may use an identical user-agent value to the browser. This may be because the gaming application was designed to only receive advertisement webpages from a particular server, which in turn only provides advertisements in a particular format. In these scenarios, the user-agent header field may be included by the gaming application in a message, but since it will be ignored by the server, this user-agent field may simply be copied from a known browser. In these situations the network node 8 is unable to differentiate the gaming application and the browser, and may therefore modify messages sent to the gaming application.

By determining header data for the messages sent by the device, the network node 8 may correct the user-agent field for those messages sent by the gaming application, and thereby ensure that only the desired messages are modified to include the toolbar.

The second use scenario is where the devices 2 and 25 are "tethering". Tethering describes the situation where a laptop computer or similar (device 25) uses a mobile telephone (device 2) as a modem to gain data access to the internet. As such, messages sent by an application on the laptop 25 are routed through the mobile telephone 2. In many cases, the operators of mobile telephone networks wish to discourage tethering as it increases the amount of data transmitted on the network and can cause congestion for other users.

One method of detecting tethering is to look at the header fields of the messages sent from the device 2. For example, where the user-agent field specifies the agent as a desktop browser, as opposed to a mobile browser, it may be assumed that the messages originate from a desktop browsing application. Since such an application can only run on a laptop or similar it can be deduced that tethering is occurring.

However, it is possible to overcome this, by causing a desktop browser to send messages in which the user-agent field claims the application sending the message is a mobile browser. This will fool the tethering detection method, and allow a user to avoid detection for tethering. However, by determining header data for messages, it is possible to correctly identify the user-agent as being a desktop browser, and thereby detect tethering.

Figure 4:
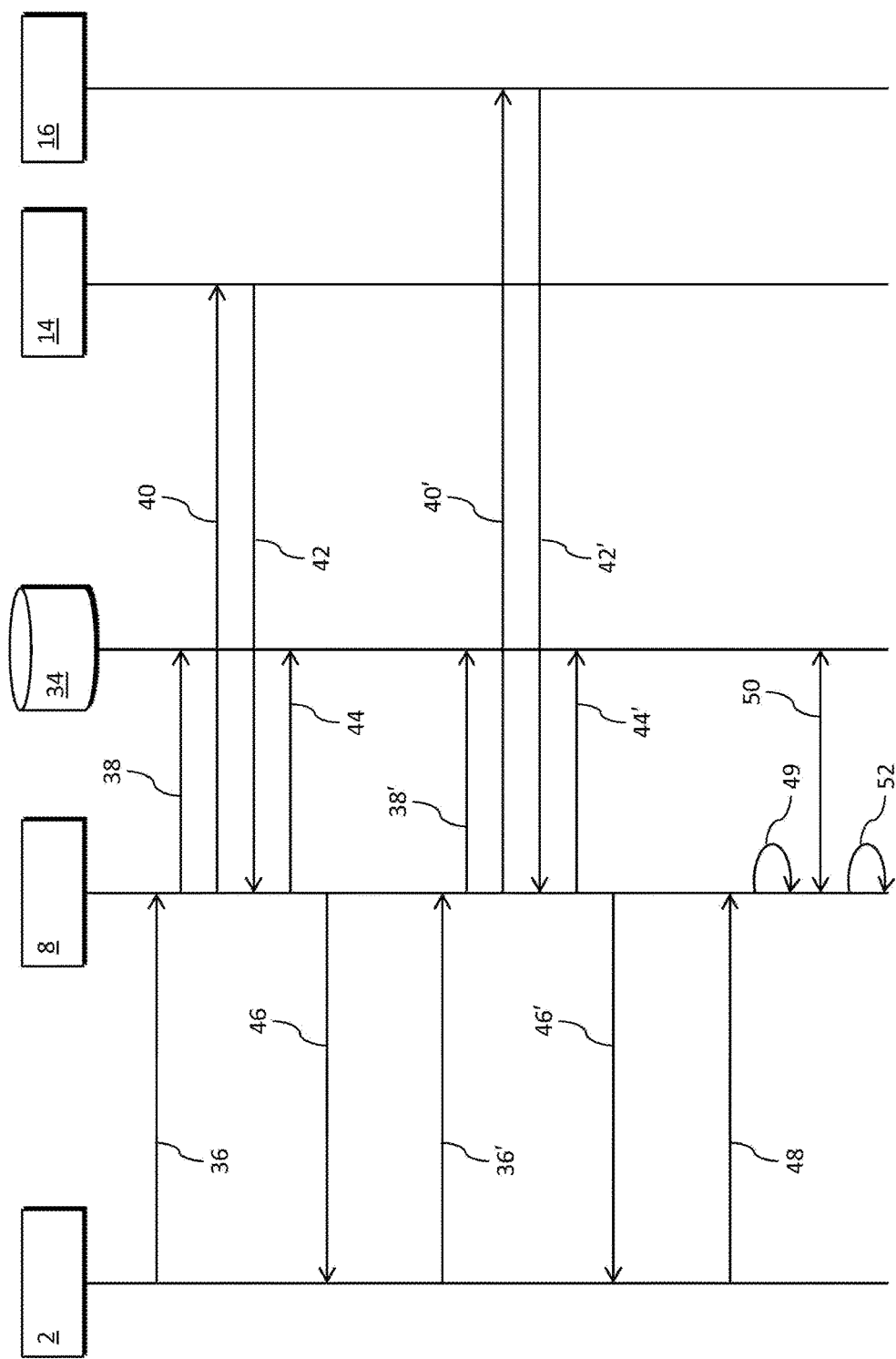
FIG. 4 shows communications flows according to an embodiment.

Methods according to embodiments will now be described with reference to FIGS. 4, 5 and 6. FIG. 4 shows messaging flows between the device 2, network node 8 and its connected memory 34, and the servers 14 and 16. While not a requirement for these embodiments, it will be assumed that these message flows are occurring in the first use scenario described above. In particular, it will be assumed that:

the second message is a request for webpage data;
the user-agent field in the header data of the second message claims that the message was sent from a generalized browser;
the second message was actually sent from the gaming application, and is a request for an advertisement;
an alert has been received by the network node 8; and
the network node 8 is intending to modify webpage data sent to the device 2 to include this alert.

In step 36, one of the applications 22 on the device 2, for example the browsing application, sends a first message to one of the servers, in this case server 14. This message is intercepted by the network node 8. In step 38 the network node extracts and stores at least some of the header data of the message in memory 34. In addition, in step 40, the message is forwarded to server 14, in accordance with a destination address of the message.

In step 42, the server 14 sends a third message to the device 2 in response to the first message. This third message is also intercepted by the network node 8. In step 44, the network node 8 may extract and store at least some of the header data of the third message in memory 34. The third message forwarded to the device 2. As mentioned above, the application on the device 2 may, in steps not shown, process the data according to known methods.

While only a single message is required for steps 48 onward to be effective, typically more than one such first message will be sent by an application(s) running on the device 2 to the servers 14 and 16. These further first messages may be sent by the same, or a different application. For example, the gaming application may send a further first message to server 16, and receive a further third message from the server 16. The messaging flows for this are shown in steps 36', 38', 40', 42', 44' and 46', which are analogous to steps 36, 38, 40, 42, 44 and 46, with the exception that server 16 is used. Many more messages may be sent and intercepted, from many more than the two applications mentioned, and many more than the two servers shown may receive and respond to the forwarded messages. As such, it will be appreciated that in embodiments, the network node 8 will have stored header data for a large number of messages sent by the device 2 in memory 34.

Subsequently, in step 48, an application on the device 2 sends a second message. This message is also intercepted by the network node 8. As mentioned above, the second message is sent by the gaming application, and contains erroneous header data.

In step 49, the network node 8 establishes that header data is to be determined for this second message. This may be done based upon the receipt of the alert as described above. The network node 8 may also determine whether the second message is a request for webpage data (as opposed to e.g. a message used for checking email), and as such that the message will initiate a response from a server containing webpage data which may be modified.

As such, in step 50, the network node 8 retrieves the stored header data (for the first messages) from the memory 34. Then in step 52, the network node 8 determines using the stored data and the header of the second message, a value for at least one given field of the header data for the second message. In some cases, the determined value for the header data may match the corresponding value in the received message, however in other cases the determined value is other than, i.e. different to the corresponding value provided in the second message.

It will be appreciated that the second message may omit certain fields in the header data, therefore in the determining step 52, the network node may determine values for these omitted fields. As such, for the purposes of this description, an omitted field will be assumed to be a field with a null value, and as such the determined value for an omitted field will still be other than the provided (null) value.

A description of the use of the determined header data will be described with reference to FIG. 5. As with FIG. 4, this description will continue in the first use scenario described above, and will continue on from FIG. 4. Therefore, prior to the steps described in FIG. 5, it will be assumed that header data for at least one first message and optionally header data for at least one third message has been stored in the memory 34, as described in FIG. 4.

Steps 48, 49, 50 and 52 are carried over from FIG. 4. As such, in step 48, a second message is received by the network node 8 from the device 2. In step 49, it is established that header data will be determined for the second message. In step 50, the network node 8 retrieves the stored header data from the memory 34, and in step 52, the network node determines a value for at least one field of the header data of the second message.

As mentioned above, in this use scenario the second message was sent from the gaming application, but the user-agent field of the second message indicated that it was sent from a browser. As such, the determined header data for the user-agent field for second message is other than the user-agent field which was sent in the second message.

Accordingly, in step 54, the network node 8 may modify the header data for the second message using the fact that the determined value for the user-agent field is different to the value provided in the second message. As such, the network node 8 may overwrite the user agent field of the second message using the determined value for the user-agent field. In addition, or alternatively, a further field may be added or modified to reflect the fact that the determined user-agent should not be sent webpage data with an alert. For example, a port number of the second message may be changed.

In step 56, the modified message is then forwarded to the server 14, and in step 58, a third message, in response to the second message, is sent from the server 14 and is intercepted by the network node 8.

In step 60 the network node 8 may modify the third message. As mentioned above, the port number of the second message may have been changed. As is known, port numbers are used to route messages, and therefore the response from the server may contain the port number of the second message. While the modified port number may be used by the network node 8 to identify that it would be inappropriate to add the alert to the webpage data contained within the third message; unless the port number is modified back to its original value, the message will not be correctly handled by the device 2. Therefore, this modification to the third message may be made.

In conclusion, in the method described above, the network node 8 is able to determine header data for a second message which is other than the header data provided in the second message. This ensures that the message, and its response, are correctly handled—in this example by not modifying the third message sent in response.

Figure 5:
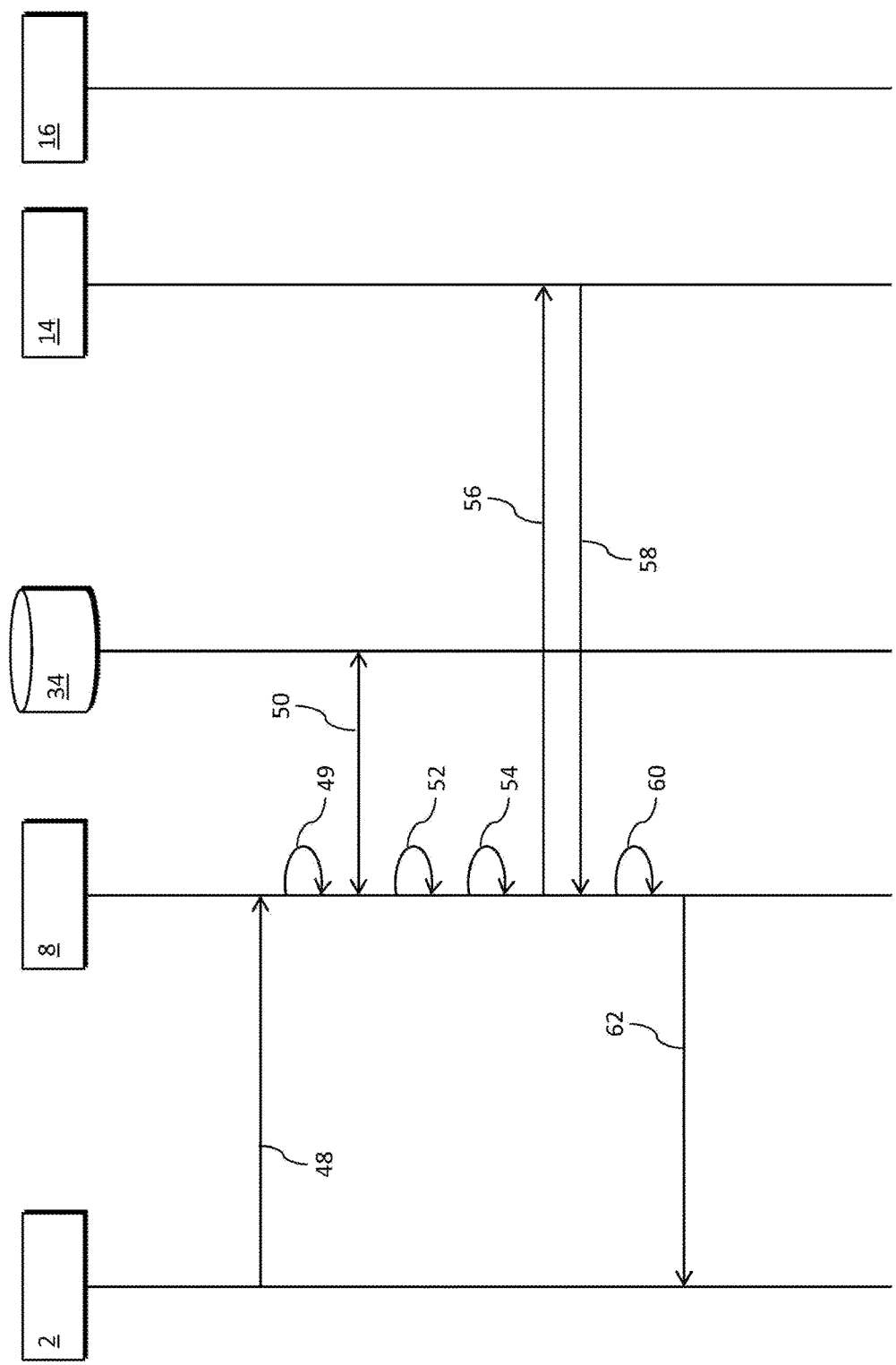
FIG. 5 shows further communications flows according to an embodiment.

It will be appreciated that the steps described in FIG. 5 are only an example of how determined header data may be used. In other embodiments, for example, neither the second nor third messages may be modified. By contrast, having determined in step 54 that header data indicating that the second message is from a gaming application, the network node 8 may store an indication of this in memory. Later, when the third message is received by the network node in step 58, the stored indication may be used to determine whether to modify the third message to include the alert, in this scenario the third message would not be modified.

A further method, showing how an application on the further device 25 may send a message will now be described with reference to FIG. 6. This embodiment will be described in the context of the second use scenario mentioned above. In other words, the device 2 is a mobile telephone, and the further device 25 is a laptop, tethering with the mobile telephone 2. Moreover, to avoid detection, the user-agent field of the messages sent by the application on the further device 25 incorrectly specifies that the application sending the message is a mobile telephone browser. In other words the browser application on the laptop 25 is 'spoofing' a mobile phone browser.

Figure 6:
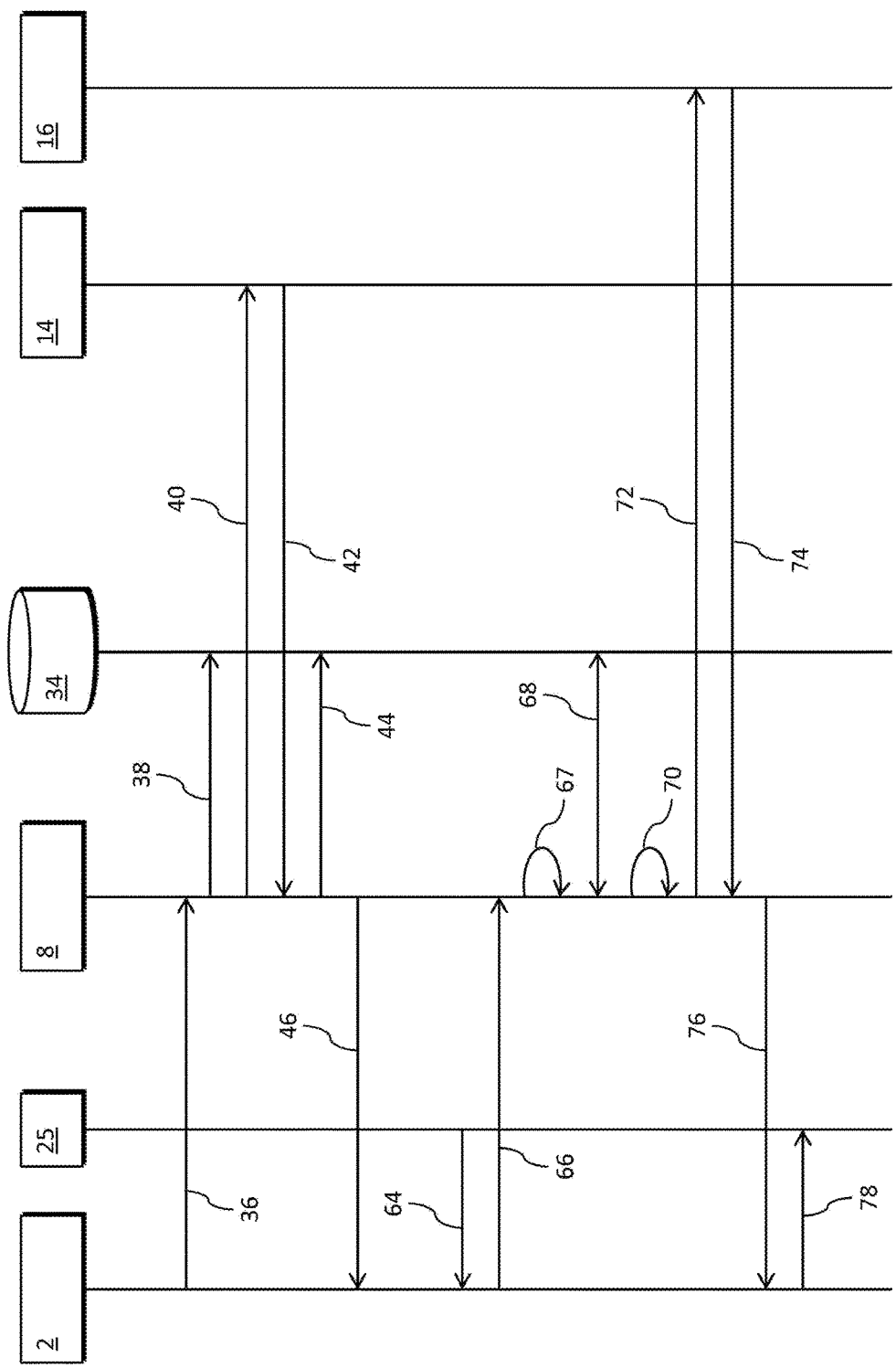
FIG. 6 shows more communications flows according to an embodiment.

In FIG. 6, by way of reference, steps 36 to 46 are shown. These are the same as steps 36 to 46 described above, and will not be described in more detail here. In summary, in these steps, an application on device 2 sends a first message to server 14 and receives a third message by way of response. Header data for these messages may be stored in the memory 34.

Subsequently, in step 64 an application on the further device 25 sends a second message to be routed to server 16. This second message is first sent to the device 2. The second message is received by the device 2, and in step 66 is forwarded on towards the server 16 to be intercepted by network node 8. In step 67, the network node may establish that header data is to be determined for the second message. In this example, as the intention is to detect tethering, the network node 8 may determine header data for all, or a sample, of the messages received from the device 2.

In step 68, having established that header data is to be determined for the second message received in step 66, and in an analogous manner to step 50 above, the network node 8 retrieves the stored header data from the memory 34. It will be appreciated that in this embodiment the stored data will include header data from a message sent by an application which was running on device 2, i.e. a legitimate mobile browser.

In step 70, using the stored header data and the header data from the second message, the network node 8 determines header data for the second message. In this example the determined header data indicates, for example through data relating to the user-agent field, that the message was sent by a desktop browser. In step 70 the determined header data may be compared with the provided header data for the second message. In this example, the desktop browser is spoofing a mobile browser and as such, the determined user-agent field is different to the user-agent field provided in the second message. As such, in this step, the mis-match may be recorded, for example in memory 34, as evidence of tethering. However, in this embodiment, the second message is not modified.

In steps 72, the second message is forwarded to server 16 and, in step 74, a third message by way of response is received. In step 76, the network node forwards the third message to the device 2, which in step 78 forwards the third message to the further device 25.

Therefore, the above method may therefore be used to detect tethering of a computer to a mobile telephone. It will also be appreciated that the reverse scenario may occur. That is a mobile browser may spoof a desktop browser. To avoid unwanted detection of tethering, the network node 8 may in this satiation determine that the user-agent should be indicative of a mobile browser, and therefore that the second message has not been sent by a tethered laptop or similar.

Additional Details and Modifications

In the above description some messages were described as being first messages, for which header data is stored, and others as second messages, for which header data is determined. However, it will be appreciated that any or all messages may be both first and second message. In other words, any given message may have its header data stored, and have header data determined for it.

Some applications, such as browsers, often identify a large amount of information about the application and device in a user-agent field. For example, the user-agent field may identify the browser name and version; the device make and model; and the type and version of an operating system running on the device. As such, in determining header data, some or all of this information may be determined. In some cases, a user-agent field may be provided in a second message, however this user agent field may be incomplete, in that some of the above mentioned information is omitted. In these cases, the determined header data may include the omitted information.

Furthermore, while two specific scenarios were described in which it was desirable to determine header data for a message so as to place the description in to context, it will be appreciated that there will be many other scenarios in which determination of header data is desirable. As such, the establishment of whether to determine header data may take into account other factors than those described.

For example the network node may both store and determine header data for every message which is sent by the device 2. Alternatively, the network node 8 may take a random sample of the messages. That is, at a predetermined frequency, each message may be treated as a second message and the header data for that message may be determined. This may provide an effective method of determining whether e.g. tethering is being used.

In some cases, the network node 8 may monitor the header data for messages sent by the device 2, and where there is a change in at least some of the header data, the network node 8 may determine header data for that message. For example, where a plurality of applications are sending messages, each application may be assigned a unique identifier within the device, such as a port number. Therefore the network node may monitor the port number provided in each message, and when the port number changes, may make a fresh determination of the header data. This may be used to track the applications being used on given device. Once header data has been determined for a given port number, and therefore application, this information may be stored to avoid unnecessary repetition.

The network node 8 may modify some or all of the messages being sent to or from the device 2. As such, where a message is to be modified, the network node 8 may make a determination of the header data for a message to ensure that only appropriate messages are modified.

In addition to the examples described above, having determined header data for a given message, there are a number of uses for the determined header data. For example, as mentioned above, the network node 8 may modify third messages sent to the device 2, and use the determined header data to accurately determine which messages to modify.

In some embodiments, the network node 8 may modify outgoing messages based on the determination. For example, the network node 8 may use header data from previous messages to determine header data which has been omitted from a given request. As such, if previous header data, that is the header data from a first message, indicates that compressed data is acceptable, then the network node may determine that the header data for the second message may also indicate that compressed data is acceptable. Should such an indication be absent from the header data of the second message, then the header data of the second message may be modified appropriately. This may subsequently reduce the network usage of the device.

The above examples described the user-agent field being determined. However it will be understood that any other header data field may be determined. Moreover, in some cases, a determination of one field may lead to a modification of another.

In some embodiments, as a first step, the network node 8 may use the stored header data to determine a type of the device (i.e. a make and model). This may subsequently be used to limit the field of possible determined header data for the second message.

One method of determining the type of device is to look at portions of header data which are unique to a make or model of device. For example, if one or more of the first messages contain header data which identifies that the first message was sent by an iPhone's mail client, the network node may determine, with a high confidence value, that the device 2 is an iPhone. Alternatively, the network node 8 may use the header data to determine the intended recipient of a given message. As such, if the device 2 has sent first messages to, and received third messages from, a server which stores apps for the Android system, then the network node 8 may determine the type of the device to be an Android smartphone. A similar system may be used to determine tethering, for example, if messages are sent to an update server for Microsoft Windows, then there would be a high degree of certainty that the device sending the messages is a computer running Microsoft Windows, and not a mobile telephone.

While the above describes relatively concrete methods of determining a type of the device, other factors may be used in the determination. For example, the network node 8 may store header data signatures, that is information on the type and order of the fields included in the header data sent by a particular device or application. These stored signatures may be compared with the stored header data, and a match may be used to determine the type of device.

The network node 8 may then determine the type of application (i.e. name and version number) sending the second message. To do this the network node 8 may use the determined type of the device sending the message, so as to reduce the number of possible applications.

To determine the type of application, the network node 8 may compare the header data of the second message (the one for which the header data is being determined) with the stored header data. This comparison may be done to identify previous messages sent by the application sending the second message. One method of associating messages sent from a given application is to look at a port number of the messages. As header data is now available for multiple messages, there is a larger dataset from which to make a determination. The network node 8 may also identify third messages which are sent in response to the first messages, so as to be able to retrieve header data from any messages sent from the servers to the application on the device 2.

Having identified header data associated with the first and optionally the third messages associated with the application of interest, the network node 8 may use the larger set of header data to determine header data for the second message. This may be done by looking at the identities of the servers the first messages were sent to. If, for example, the first messages and the second were exclusively sent to a single server, it may be assumed, with a moderate degree of confidence, that the application of interest is not a generalized browser, and is instead an application which only communicates with a predetermined server, such as the gaming application described above.

Another alternative use for the identified header data is to look at for any differences in the requests. For instance, if some requests are for a first format of data, and other requests are for a second format, then it can be determined that the application is capable of dealing with both types of request.

Another example of how the format, or destination, of second messages (and accordingly the third messages sent in response) may be used to determine that a type of the application is as follows. This will be described in the context of a gaming application. For instance, the gaming application may send first messages to a gaming server, and receives e.g. XML responses. This may be used to e.g. download high scores for other users. If later, the gaming application send a second message, which is a webpage request (for e.g. an advertisement), then the network node may use the previous first messages to determine that the sender of the message is a gaming application.

There will be other methods of determining the type of application. Nevertheless, once the type of application has been determined, the header data appropriate for that application may also be determined. In some cases the identified application may be used to determine a value for a user-agent field. In other cases the identified application may be used to determine capabilities of the application, and therefore header data specifying e.g. the capabilities of the application, such as acceptable formats for requested data.

In some embodiments, as well as storing the header for any received message, the network node may send data to the device with the intention of identifying further data about the device 2. For example, where the messages are related to webpage data, the network node 8 may modify webpage data sent to the device 2 to include JavaScript instructions. These JavaScript instructions may subsequently be executed on the device 2. During their execution, the JavaScript instructions may determine properties of the application in which the JavaScript is being executed, and report this information to the network node 8.

In addition to the use of JavaScript, some embodiments may use, for example, a subscriber database to determine header data. This subscriber database may identify a make and model of device. The database may equally contain information on, for example, the applications purchased or downloaded onto a particular device.

In some embodiments, the network node 8 may be contained within a server such as server 14 or 16. As such the network node may not intercept any message, but rather cooperate with the server (which provides responses to the messages) to determine header data for messages as required.

Equally, the network node 8 may not itself modify any messages, but rather signal to other network nodes which perform this function.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A method of determining header data at a network node of a communications network, the method comprising:
    intercepting a first message transmitted from a first application of a first user device to a server,
        wherein the first message comprises first header data that is correct, and
        wherein the first header data comprises a source address and one or more further fields each having a value;
    extracting at least some of the first header data from the first message;
    storing data indicative of the extracted at least some of the first header data;
    intercepting a second message transmitted from a second application of the first user device to the server or from the second application of the first user device to another server,
        wherein the second message comprises second header data that is incorrect or is omitted,
        wherein the second header data comprises a source address and one or more further fields each having a value;
    selecting, from the stored data, data associated with the source address of the second message;
    determining, based at least in part on the second header data and the selected stored data indicative of the extracted at least some of the first header data of the first message transmitted from the first user device-, a value for at least one field of the second header data,
    wherein the second header data is from the second message, and
    determining if the determined value is different than a provided value for the at least one field of the second header data by comparing the determined value with the provided value for the at least one field of the second header data;
    responsive to a determination that the determined value is different than the provided value for the at least one field of the second header data, modifying the second header data to overwrite the provided value with the determined value;
    forwarding the second message to the or said another server with the modified second header data; and
    wherein the header data comprises a user-agent field, and the at least one field of the second header data is a user agent field.

2. The method of claim 1, wherein the first message comprises a request for webpage data to be processed by a browser.

3. The method of claim 1, further comprising using the determined value to retrieve property data associated with an agent sending the second message.

4. The method of claim 1, wherein the first message originates from a first application running on the first user device and the second message originates from a second application running on the first user device.

5. The method of claim 1, wherein the first header data comprises one or more of:
    one or more fields identifying the first user device from which the messages are transmitted;
    one or more fields identifying an IP address of the first user device from which the messages are sent;
    one or more fields identifying requested data;
    one or more fields identifying an acceptable format of the requested data;
    one or more fields identifying a protocol;
    one or more fields identifying an application sending the message;
    one or more fields identifying the capabilities of an application sending the message; and
    one or more fields identifying a resolution of a screen on which the requested data will be displayed.

6. The method of claim 1, further comprising:
    receiving a third message, the third message comprising third header data; and
    storing data indicative of at least some of the third header data.

7. The method of claim 1, wherein the first message and the second message are intercepted at a network node, and the method further comprises forwarding the first message and the second message to the or said another server based at least in part on a destination address specified in at least one of the first header data and the second header data.

8. The method of claim 7, further comprising:
    receiving at least one third message, the at least one third message being a response to at least one of the first message and the second message, the at least one third message comprising third header data; and
    storing data indicative of at least some of the third header data;
    wherein determining a value for the at least one given field associated with header data for the second message is based additionally on the stored data indicative of at least some of the third header data.

9. The method of claim 8, wherein the third header data comprises at least one field, the at least one field comprising one or more of:
    a field identifying a type of data contained in the response;
    a field identifying a format of data contained in the response;
    a field identifying a protocol used for data contained in the response;
    a field identifying a size of the response.

10. The method of claim 7, further comprising:
    receiving a third message, the third message being a response to the second message and comprising third header data;

modifying the third header data based at least in part on the stored data.

11. The method of claim 1, wherein the first message originates from the first user device, wherein the second message is communicatively coupled to the first user device such that the second message is transmitted via the first user device, and wherein the method further comprises identifying, from the determined value, whether the second message originates from a device other than the first user device.

12. The method of claim 1, further comprising:
sending data in response to the second message, at least a part of the sent data being modified based on the determined value.

13. The method of claim 1, wherein at least one of the first message and the second message is received from an application, and the method further comprises:
sending a response to the at least one message, the response including scripting instructions which are configured, when executed within the application, to identify at least one property of the application and cause the application to send information indicative of the at least one property; and
receiving the information indicative of the at least one property;
wherein the value for the at least one given field associated with header data for the second message is determined based additionally on the at least one property.

14. A system for determining header data at a network node of a communications network, the system comprising:
a processing system configured to:
intercept a first message transmitted from a first application of a first user device to a server,
wherein the first message comprises first header data that is correct, and
wherein the first header data comprises a source address and one or more further fields each having a value;
extract at least some of the first header data from the first message;
storing data indicative of the extracted at least some of the first header data;
intercept a second message transmitted from a second application of the first user device to the server or from second application of the first user device to another server,
wherein the second message comprises second header data that is incorrect or is omitted,
wherein the second header data comprises a source address and one or more further fields each having a value;
select, from the stored data, data associated with the source address of the second message;
determine, based at least in part on the second header data and the selected stored data indicative of the extracted at least some of the first header data of the first message transmitted from the first user device, a value for at least one field of the second header data,
wherein the second header data is from the second message, and
determine if the determined value is different than a provided value for the at least one field of the second header data by comparing the determined value with the provided value for the at least one field of the second header data;
responsive to a determination that the determined value is different than the provided value for the at least one field of the second header data, modify the second header data to overwrite the provided value with the determined value;
forward the second message to the or said another server with the modified second header data; and
wherein the header data comprises a user-agent field, and the at least one field of the second header data is a user agent field.

15. A non-transitory computer-readable medium comprising computer-executable instructions which, when executed by a processor, cause a computing device to perform a method of determining header data at a network node of a communications network, the method comprising:
intercepting a first message transmitted from a first application of a first user device to a server,
wherein the first message comprises first header data that is correct, and
wherein the first header data comprises a source address and one or more further fields each having a value;
extracting at least some of the first header data from the first message;
storing data indicative of the extracted at least some of the first header data;
intercepting a second message transmitted from a second application of the first user device to the server or from the second application of the first user device to another server,
wherein the second message comprises second header data that is incorrect or is omitted,
wherein the second header data comprises a source address and one or more further fields each having a value;
selecting, from the stored data, data associated with the source address of the second message;
determining, based at least in part on the second header data and the selected stored data indicative of the extracted at least some of the first header data of the first message transmitted from the first user device, a value for at least one field of the second header data,
wherein the second header data is from the second message, and determining if the determined value is different than a provided value for the at least one field of the second header data by comparing the determined value with the provided value for the at least one field of the second header data;
responsive to a determination that the determined value is different than the provided value for the at least one field of the second header data, modifying the second header data to overwrite the provided value with the determined value;
forwarding the second message to the or said another server with the modified second header data; and
wherein the header data comprises a user-agent field, and the at least one field of the second header data is a user agent field.

* * * * *